United States Patent [19]

Snuttjer et al.

[11] Patent Number: 5,186,277
[45] Date of Patent: Feb. 16, 1993

[54] GENERATOR SEALING OIL TEMPERATURE CONTROL METHOD AND APPARATUS UTILIZING TEMPERATURE MATCHING

[75] Inventors: Owen R. Snuttjer, Oviedo; Michael J. Rasinski, Winter Springs, both of Fla.

[73] Assignee: Westinghouse Electric Corp., Pittsburgh, Pa.

[21] Appl. No.: 847,559

[22] Filed: Mar. 6, 1992

Related U.S. Application Data

[63] Continuation-in-part of Ser. No. 646,925, Jan. 28, 1991, Pat. No. 5,147,015.

[51] Int. Cl.$^5$ ............................................. F01M 5/00
[52] U.S. Cl. ........................... 184/6.22; 184/104.1; 277/3; 277/22; 277/75
[58] Field of Search ................. 277/3, 15, 22, 75; 184/6.21, 6.22, 104.1, 104.2, 104.3, 6.4, 108

[56] References Cited

U.S. PATENT DOCUMENTS

| | | | |
|---|---|---|---|
| 2,608,380 | 8/1952 | Rice | 415/175 |
| 2,664,173 | 12/1953 | Karig | 184/6.22 |
| 3,297,329 | 1/1967 | Smith et al. | 277/15 |
| 3,976,165 | 8/1976 | Pilarczyk | 184/6.16 |
| 4,193,603 | 3/1980 | Sood | 277/3 |
| 4,390,082 | 6/1983 | Swearingen | 184/6.4 |
| 4,486,024 | 12/1984 | Cooper | 277/3 |
| 4,495,035 | 1/1985 | Swearingen | 203/23 |
| 4,503,679 | 3/1985 | Saito et al. | 60/605 |
| 4,792,911 | 12/1988 | Gonzalez et al. | 364/551.02 |
| 4,969,796 | 11/1990 | Wescott et al. | 415/110 |

FOREIGN PATENT DOCUMENTS

| | | |
|---|---|---|
| 521064 | 8/1954 | Belgium . |
| 3115149 | 11/1982 | Fed. Rep. of Germany . |
| 3618794A | 6/1986 | Fed. Rep. of Germany . |
| 53-139036 | 5/1978 | Japan . |
| 0078892 | 6/1980 | Japan ............................ 184/6.22 |
| 57-90498 | 5/1982 | Japan . |
| 58-144617 | 8/1983 | Japan . |
| 0053608 | 3/1985 | Japan ............................ 184/6.22 |
| 63-309702 | 12/1988 | Japan . |

OTHER PUBLICATIONS

"Turbine-Generator Instruction Book".

Primary Examiner—Ira S. Lazarus
Assistant Examiner—Alan B. Cariaso
Attorney, Agent, or Firm—Michael G. Panian

[57] ABSTRACT

A system for providing seal oils to a gland seal that surrounds the shaft of a generator with the temperature differences between the oils minimized, as well maintained at a temperature which is greater than that for a bearing lubrication oil supply system. The temperature of the air-side seal oil is used as a reference and then the difference between the air- and hydrogen-side seal oil temperatures is used to control the hydrogen-side seal oil temperature. The air-side temperature is controlled by a separate controller using the bearing oil temperature as a reference. The system advantageously prevents thermal differential expansion from occurring in the generator shaft and gland seal, and eliminates the need for operator attention for seal oil temperature control.

22 Claims, 6 Drawing Sheets

5,186,277

GENERATOR SEALING OIL TEMPERATURE CONTROL METHOD AND APPARATUS UTILIZING TEMPERATURE MATCHING

CROSS-REFERENCE TO RELATED APPLICATION

The present application is a continuation-in-part of co-pending application Ser. No. 07/646,925 filed on Jan. 28, 1991, now U.S. Pat. No. 5,147,015 which application is assigned to the present assignee hereunder and incorporated herein by reference.

TECHNICAL FIELD

The invention relates to turbine generators, and more specifically to gland seals and bearing lubrication for preventing or minimizing both the escape of hydrogen gas from a generator and the ingress of moisture and air into the generator, as well as maintaining a preferred temperature difference between the gland seal temperature and the bearings. In particular, the present invention relates to a system for controlling temperatures of seal oils supplied to generator gland seals and the bearing lubrication oil to control temperature differences between the oils that can create thermal differential expansion in the generator shaft.

BACKGROUND OF THE INVENTION

A typical generator arrangement will include a shaft which transmits torque from a turbine to rotate a rotor in the generator to generate electricity. The rotor shaft also extends from the other side of the generator (often referred to as the exciter side) for support by a bearing. Generally, within the generator, an environment is provided which includes a gas such as hydrogen or helium for better heat conduction and reduced windage losses. On the shaft side which transmits the torque (turbine side) as well as the shaft side which provides support (exciter side), seals are provided for preventing escape of the gas, and also for preventing ingress of moisture or air to the interior of the generator. The seals may be in the form of a gland seal which directs two flows of oil toward and along the shaft. One flow of oil (hereinafter the hydrogen-side seal oil) will flow along the shaft toward the generator to prevent the escape of hydrogen to the outside atmosphere. Another flow (air-side seal oil) flows outwardly toward the bearing to prevent access of air or moisture into the generator. Since the oils tend to absorb hydrogen, air and moisture, the oil feed systems are separate, thereby preventing release of hydrogen to the outside atmosphere, and maintaining a high hydrogen purity within the generator. For best operation, the temperatures of the air-side seal oil and hydrogen-side seal oil should be maintained at or near the same temperature, and should be kept within 4° F. If the oils are not at or near the same temperature, the seal ring can become distorted or non-uniformly thermally altered, thereby producing vibrations as the shaft rotates. Ring distortions can produce a rubbing between the shaft and the ring of the seal, which can in turn generate localized heating of the shaft causing it to bend and producing vibrations. Thus, it is essential to maintain the air-side seal oil and hydrogen-side seal oil at or near the same temperature.

Currently, two methods are available for temperature control of the hydrogen- and air-side oils. In one method, separate manual controls of cooling water to a cooler for the hydrogen-side oil, and a cooler for the air-side oil are utilized to control the respective oil temperatures. However, manual control requires constant adjustment to maintain the same or approximately the same temperatures of the two oils. Constant adjustment is necessary due to the continued variations in the flow rates and temperatures of the seal oil, as well as flow rates and temperatures of the cooling water supplied for controlling the temperatures. Thus, constant attention of an operator is required.

In a second method, individual automatic temperature controllers are provided for each cooler, with the temperature controllers set at the same temperature. The use of two controllers also requires adjustments to ensure that the temperatures are similar, since as the cooling water temperature varies, the desired flow response to a particular temperature deviation will also vary. In addition inherent system deviations make it difficult to maintain a small temperature differential. A major problem and expense involved with the use of separate controls is due to the requirement that the temperature control is finely tuned such that each system accurately responds to the set temperature, with the two controllers having a combined tolerance which ensures the required minimal temperature differential.

Co-pending application Ser. No. 07/646,925 now U.S. Pat. No. 5,147,015 discloses a system for providing seal oils to a gland seal ring which can accurately and economically control the temperatures to reduce or minimize temperature differentials between the oil supplies. The system eliminates the need for constant adjustment as is the case with manual control or separate individual controllers, by utilizing the air-side temperature as a reference for controlling the hydrogen-side oil temperature.

An additional lubrication system is provided to supply oil to the generator bearings, which controls the temperature supplied to the bearings independently of the seal oil temperature. Heretofore, not much attention has been focused on the temperature difference existing between the bearing seal oil and the gland seal oil systems. It has been discovered by the Applicants that it is also beneficial to maintain the seal oil temperatures higher than the bearing oil temperatures. The seal rings are adjacent to the bearings, and the shaft temperature— and subsequently its diameter—is affected by the changes in bearing oil temperatures. The brass seal ring dimensions change to a greater extent with changes in temperature than the steel generator shaft. Low seal oil temperatures decrease the clearance between the shaft and the ring. This can also help produce "rubs" between the shaft and ring and cause damage thereto.

What is needed then is a arrangement for controlling the temperatures of the gland seal oil system and the bearing lubrication oil system which can maintain a preferred temperature difference therebetween. Preferably such an arrangement is capable of automatic operation to obviate the need for continual manual operation, and minimize the complexity required for the control scheme.

SUMMARY OF THE INVENTION

A system for supplying seal oil to a gland seal for a generator shaft and lubrication oil to a bearing upon which the generator shaft rotates is provided. In accordance with the present invention, a system is provided whereby the temperature differential between the airand hydrogen-side seal oil systems is maintained within a predetermined range, but at level greater than the bearing lubrication oil system. A gland seal supply system includes first oil feeding means for providing oil to a first portion of the gland seal and second oil feeding means for providing oil to a second portion of the gland seal. The apparatus of the present invention comprises a first reference temperature means for providing a first reference temperature signal indicative of the temperature of the oil fed to the first portion of the gland seal, and a first temperature control means for controlling the temperature of oil fed to the second portion of the gland seal in response to the first reference temperature signal. A second reference temperature means provides a second reference temperature signal indicative of the temperature of the lubrication oil, and a second temperature control means for controlling the temperature of oil fed to the first portion of the gland seal in response to the second reference temperature signal. Preferably, the temperature of the oil provided to the gland seal is maintained at a temperature greater than that of the bearing lubrication oil. Thus, the need for constant adjustment, and the need for extremely accurate and precise controllers for three separate systems, is not necessary.

It is therefore an object of the present invention to provide a seal oil feeding system which can provide seal oils fed at or near the same temperature, and within a desired temperature range with respect to a bearing lubrication oil supply system temperature.

It is a further object of the present invention to provide a temperature control system for providing seal oils and lubrication oils within a preferred temperature difference, in which continual adjustment of the temperature controls is not necessary.

It is another object of the present invention to provide a temperature control for seal and lubrication oils, in which precise and accurate temperature controls for each oil supply system are not necessary.

It is yet another object of the present invention to provide a system for feeding seal and lubrication oils in which the seal oil is at a specified temperature higher than the lubrication oil, in which the temperature of one system is utilized as a reference for regulating the temperature controllers of the second.

These and other objects and advantages of the present invention will be apparent from the following detailed description when read in conjunction with the drawings.

DETAILED DESCRIPTION OF THE PREFERRED EMBODIMENTS

Figure 1:
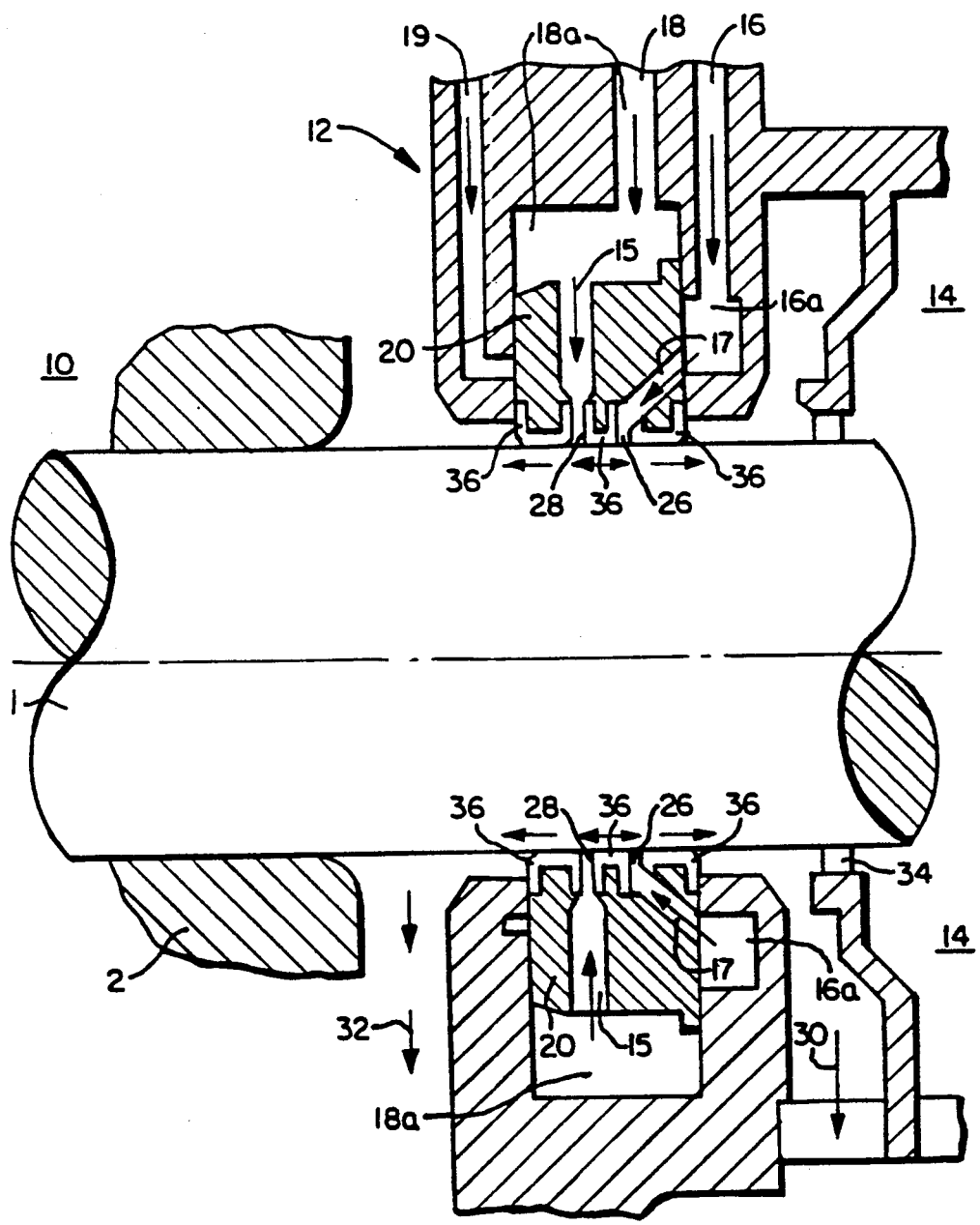
FIG. 1 is a sectional view of a gland seal and bearing structure to which the present invention pertains.

FIG. 1 illustrates a cross sectional view of a seal and bearing structure provided on larger generators (i.e., those in which the internal gas pressure of the hydrogen or other gas is in the range of 30-75 psi). The generator shaft 1 will either transmit torque from a turbine to the generator rotor on the turbine side, or will support the rotor on the exciter side opposite that of the turbine. A bearing 2 is provided for supporting the shaft, with the areas 10 outside of the bearing exposed to ambient air. The gland seal arrangement is shown generally at 12, and is in the form of an annular ring which directs fluid toward and along the shaft to form a seal between the air and moisture of the external atmosphere (10) and the internal atmosphere of hydrogen gas 14. A bearing and a gland seal are provided on both the exciter and turbine sides of the hydrogen generator, to support the shaft and to seal the hydrogen atmosphere within the generator. The gland seal does not support the shaft weight, but does support its own weight on the shaft.

Basically two flows of seal oils are provided to respective inlets 16, 18 of the gland seal. The flow through inlet 16 adjacent the generator or hydrogen-side will be referred to as the hydrogen-side seal oil, while the flow to inlet 18 will be referred to as the air-side seal oil. The gland seal includes channels 16a, 18a for directing the respective seal oils to a gland seal ring 20, which in turn directs the oils toward the shaft via channels 15, 17 formed in the annular gland seal ring. The channels 15, 17 feed the oil to annular grooves which extend about the shaft to supply oil to the shaft.

The seal oils are directed toward the shaft causing the oils to flow along the shaft as indicated by the arrows shown on the shaft 1. The hydrogen-side oil is prevented from entering into the generator by a labyrinth seal ring 34, which typically takes the form of a brass ring having a radial clearance of approximately 0.010-0.020 inches. After flowing along the shaft, the hydrogen-side oil is directed to a drain as indicated by flow 30. The air-side oil is directed toward the bearing 2, and is drained as shown at 32. U-shaped babbitts 36 are provided, which are formed of a lead, tin or other soft material, such that if contact should occur between the shaft and the gland seal, the wear on the shaft will not be as great. The babbitt thus presents a softer surface than the gland seal ring 20, (which typically is bronze) and has a higher hardness and melting point than the material of the babbitt. The hydrogen-side oil thus flows through channels 16a, 17 and groove 26, toward and along the shaft, and is drained as shown at 30. The hydrogen-side oil blocks hydrogen from escaping from the interior of the generator. The hydrogen- and air-side oils are fed at substantially equal pressures to prevent mixing of the oils. Thus, air or moisture absorbed by the air-side oil is maintained away from generator interior, and hydrogen absorbed by the hydrogen-side oil is maintained away from the external atmosphere.

The air-side seal oil is directed toward and along the shaft, is drained at 32, and prevents access of moisture and air into the interior of the generator. Float oil is also directed to a channel 19 which serves to apply pressure to the gland seal ring 20 for aiding in reducing any resultant, side forces on the gland seal ring. The flow to channel 19 may be of a pressure which is greater than that of the oils at 16, 18, but generally it is sufficient to utilize an oil pressure which is the same as that of the oils 16, 18 and typically the oil supplied at 19 will be from the same source as that of the air-side seal oil fed to the seal at 18. The float oil serves to compensate for the gas pressure of the generator interior which applies an axial outward force on the gland seal ring.

As mentioned earlier, it is extremely important to minimize the temperature differences between the hydrogen-side seal oil and the air-side seal oil. The temperature differences should be, at most, 4° F. If the temperature differences are not minimized, the non-uniform thermal expansion of the gland seal ring can cause vibrations and damage the generator shaft. For example, if the hydrogen-side oil is hotter than the air-side, gland seal ring portions adjacent the hydrogen-side will be enlarged relative to the air-side, which can result in vibrations due to rubbing of the gland seal ring (or more particularly, the babbitt associated with the ring), which in turn causes localized heating and bending of the shaft.

Figure 2:
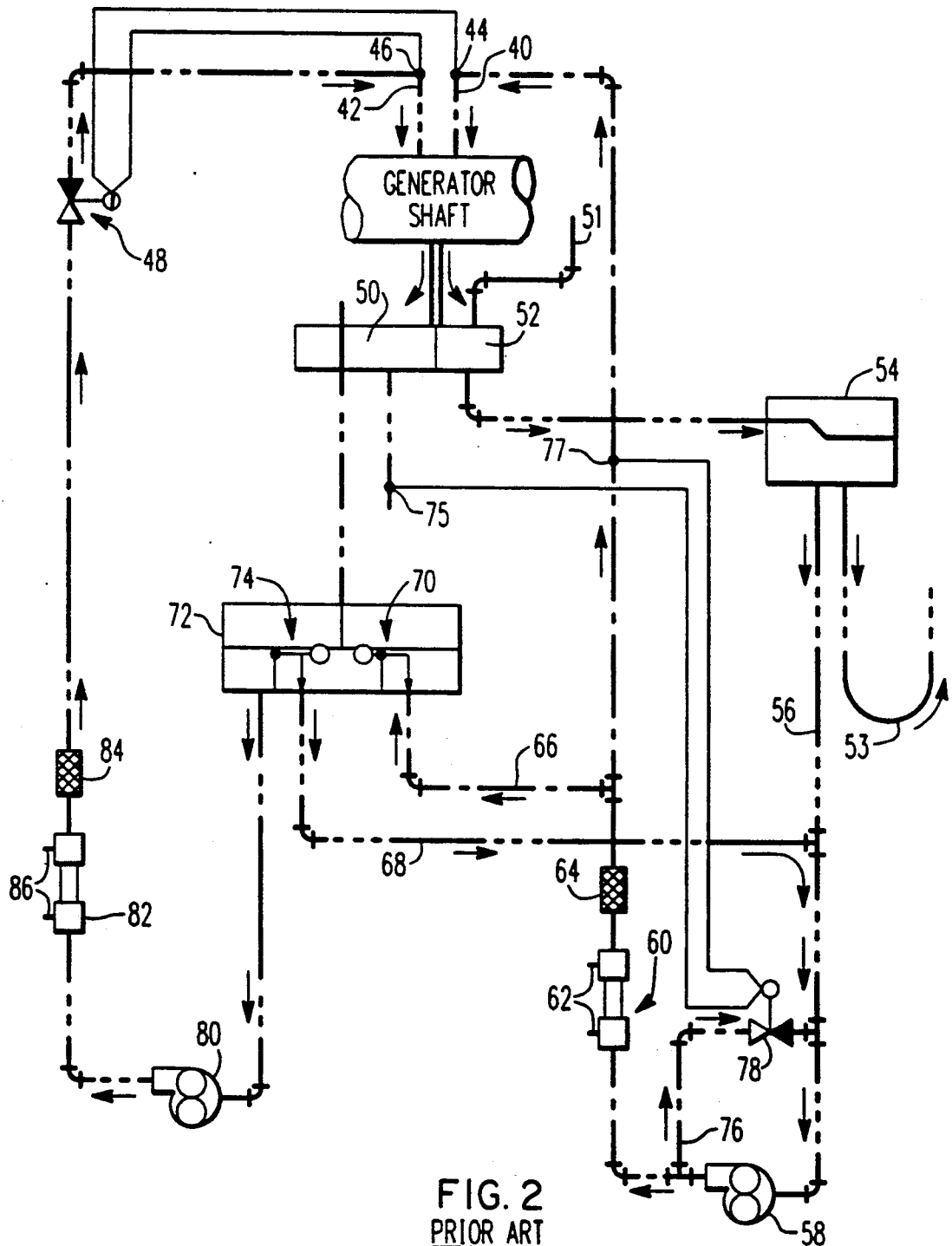
FIG. 2 is a schematic of conventional hydrogen-side and air-side oil flow systems.

FIG. 2 illustrates a feed system for the hydrogen- and air-side seals in accordance with the existing method or system. As shown in FIG. 2, a seal on the generator shaft will include an air-side seal oil directed toward the generator shaft as shown at 40, and a hydrogen-side seal oil feed as shown at 42. A pair of pressure sensors 44, 46 are provided for operation of a pressure equalizing valve 48, such that the pressure of the air-side and hydrogen-side seal oils are the same. After passing over the generator shaft, the hydrogen-side oil drains from the gland seal (30, FIG. 1) to a defoaming tank 50. The defoaming tank slows the oil velocity and provides a large oil surface area which allows hydrogen bubbles to escape from the oil.

The air-side seal oil flows (32, FIG. 1) from the gland seal to a common drain 52 with the bearing lubrication oil return as shown at 51. The bearing oil and air-side seal oil are returned to a loop seal tank 54 where oil vapors (and possible traces of hydrogen) are drawn off by a loop seal vapor extractor. The loop seal tank provides an interface with the main lubrication system of the generator, receiving oil from the air-side of the gland seal and from the bearings (via drain 52), with oil returning to the lubrication system as shown at 53. Loop seal tank 54 provides a source of oil for the air-side seal oil 58 via line 56. Thus, in the conventional system, the loop seal tank receives the hot air-side and bearing oil, allows excess to return (53) to the main lube oil system, and passes hot oil through pump 58 for cooling by the cooler 60.

The air-side oil from loop seal tank 54 is then pumped through a cooler 60 which includes water inlet and outlet ports 62 for supplying cooling water for controlling the temperature of the oil. After passing through a filter 64, the oil proceeds to the generator shaft as shown at 40.

Additional lines 66, 68 are provided for maintaining an appropriate supply of oil in the hydrogen-side oil system. In particular, a float valve device 70 is provided in a regulating tank 72 which opens when the level of oil is low to receive oil from the flow line 66. An additional float valve 74 is provided which opens when the level is high to release oil through the line 68 to the suction side of the air-side seal oil pump. A bypass line 76 is provided with a bypass regulator 78 for maintaining the pressure of the air-side seal oil, such that it is maintained sufficiently above the hydrogen gas pressure in the generator during normal operation and typically the oil pressure will be maintained at 12 psi above the hydrogen gas pressure. To achieve the desired pressure differential, a sensor 75 senses gas pressure in the headspace of the defoaming tank, and sensor 77 senses pressure of the air-side oil, with the valve 78 controlled to maintain the oil pressure 12 psi above the gas pressure.

The hydrogen system feeds oil from the regulator tank 72 to a pump 80 which supplies pressurized oil for feeding through the cooler 82 and filter 84, and then through equalizing valve 48 for feed to the generator shaft as shown at 42. A pump bypass regulator (not shown) may also be provided to allow part of the pump not needed by the pressure equalizing valves to return to the suction side of the pump. The hydrogen-side cooler includes flow passages 86 for feeding of water, with the water feed rate controlled to control the cooling of the oil. In the prior art system, a manual control of the cooling water to the hydrogen and air-side coolers can be utilized for adjusting the temperatures in the air-side and hydrogen-side seal oil systems. However, it is often difficult to control the temperatures to minimize the temperature differences utilizing manual control, and constant operator attention is necessary.

Alternatively, individual temperature controllers have been provided which are set at the same temperature. However, with the individual controllers, deviations in the accuracy of the individual systems can cause the temperatures to deviate from the set temperature. More significantly, even where the temperature controllers are accurate, the systems will fluctuate due to varying flow rates and water coolant temperatures, with the oil and hydrogen seal oil temperatures deviating from the set temperature until the controller is able to adjust the coolant flow rates in an attempt to bring the oil temperatures to the set temperature. In addition, existing systems require separate coolers for controlling temperatures to be similar and below a maximum temperature, preferably no greater than 120° F.

Figure 3A:
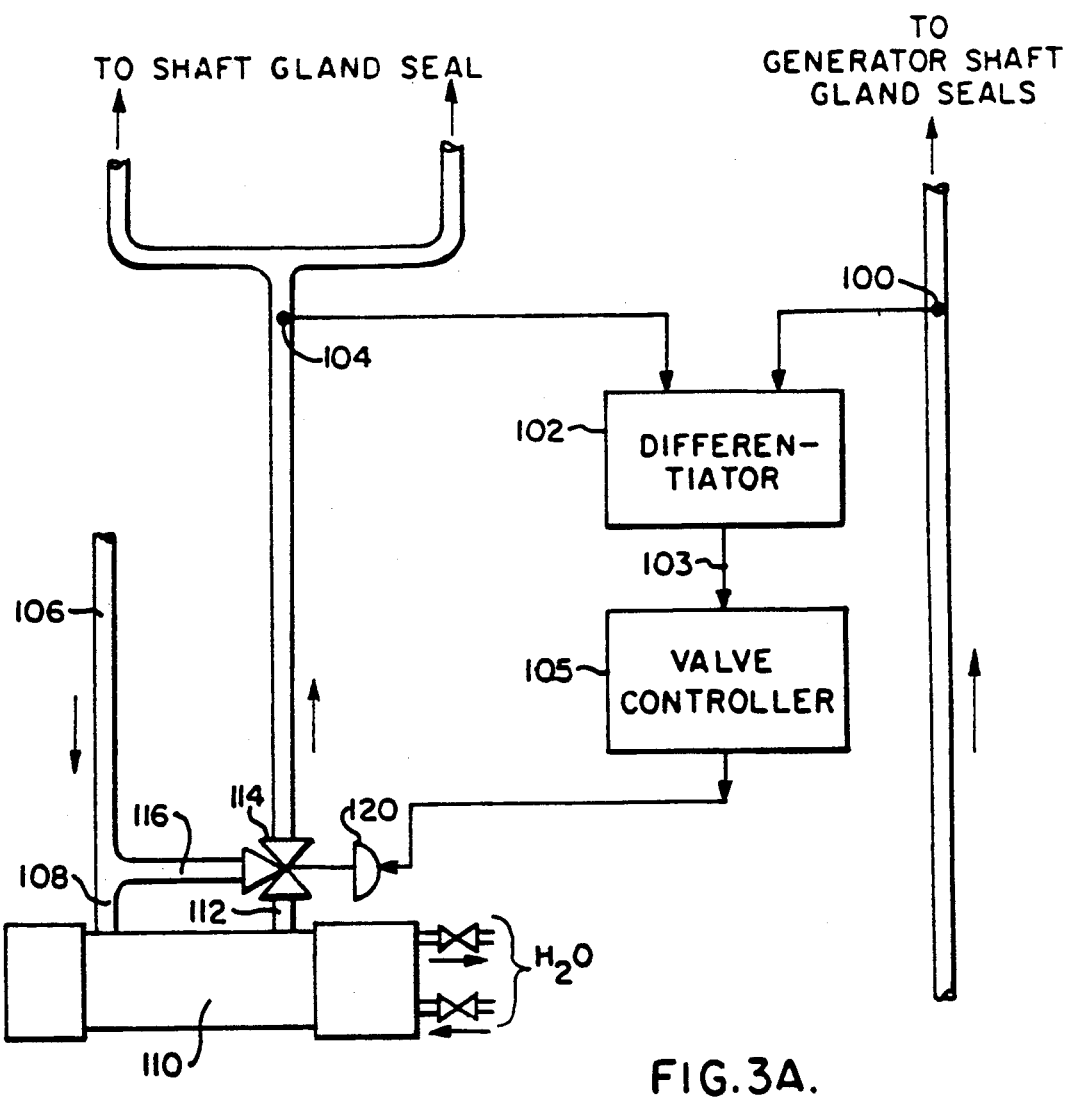
FIG. 3A is a schematic of the air-side and hydrogen-side oil temperature control system in accordance with the present invention.
Figure 3B:
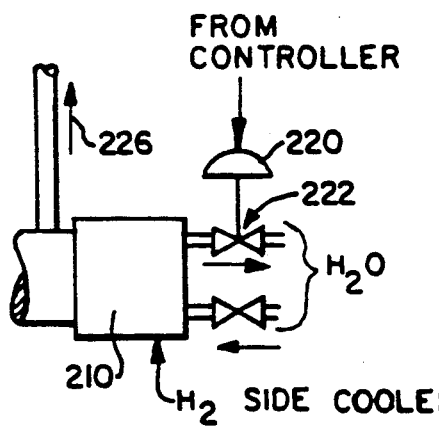
FIG. 3B shows a modification of the temperature control system of FIG. 3A.

FIGS. 3A and 3B illustrate the invention of co-pending application Ser. No. 07/646,925 in which separate control of the air-side and hydrogen-side oils is not utilized, but rather a differential temperature control system is utilized for controlling the hydrogen-side oil temperature, utilizing the air-side oil temperature as a reference. In particular, a sensor 100 is provided which senses the temperature of the air-side oil being fed to the gland seal and sends a signal indicative of the temperature to a differentiator 102. A temperature sensor 104 is also provided which provides the differentiator 102 with a signal indicative of the temperature of the hydrogen-side seal oil being fed to the gland seals. The differentiator 102 then provides a signal as shown at 103 to a valve controller 105 which then controls cooling of the hydrogen-side oil.

The hydrogen-side oil flows from a pump along passage 106 and is fed into the cooler at 108 and is cooled by the cooler 110, and is then fed out of the cooler at 112 through a three-way valve 114 and toward the gland seals. A bypass line 116 is provided which provides for mixing of cooled and uncooled oil to control the oil temperature fed to the gland seals. The three-way valve 114 controls the proportion of the mixing. The valve controller 105 thus provides a signal to a control or actuator 120 for the valve 114 to vary the mixing to adjust the hydrogen-side oil temperature to the reference temperature of the air-side oil. Thus, where the temperature of the hydrogen-side oil is sensed to be greater than that of the air-side oil, the three-way valve 114 reduces or eliminates the flow through 116, such that an increased proportion of the flow through the valve 114 is from the cooler outlet 112. Where the temperature is lower than that of the reference temperature, the valve 114 is controlled to increase the flow from the bypass 116.

Since the temperature control system of co-pending application Ser. No. 07/646,925 utilizes the air-side oil as a reference, separate accurate controlling of the air-side oil is not necessary for temperature matching with the hydrogen-side oil. Since separate, precise control of the air-side oil with the hydrogen-side oil is not necessary, a separate cooler for the air-side oil is not necessary, and the air-side system can simply utilize oil from the lube system which has been cooled in the main system. Most significantly, the temperature difference between the air-side and hydrogen-side oils is more consistently minimized, since the system is not as subject to the fluctuations of two independently controlled systems.

In addition to these advantages, in the FIG. 3A system a more immediate and predictable response can be provided by the mixing of cooled and uncooled oil, since it is the mixing of oil which is provided for controlling the temperature, in contrast to the prior art system which controls the feed rate of the cooling water to the cooler. Often the cooling water temperature varies widely, and it is therefore difficult to predict the effect of a change in the water flow rate on the cooling of the oil. With the FIG. 3A system, the flow rate through the cooler can be maintained substantially constant. Another advantage of the FIG. 3A system resides in the ability to maintain a high water flow rate through the cooler, such that the formation of deposits within the cooler is reduced, thereby prolonging the life and efficient operation of the cooler.

An alternative embodiment of the control is shown in FIG. 3B. In the FIG. 3B arrangement, the bypass 116 and three-way valve are eliminated, and the temperature is controlled by controlling the flow rate of water through the cooler. While the FIG. 3B system does not provide the advantages associated with the oil mixing mentioned above, it is still advantageous over the prior art systems in eliminating the temperature controls and coolers for the air-side seal oil, and in providing a more consistent minimized temperature difference between the hydrogen-side and air-side seal oils. In the FIG. 3B arrangement, a control or actuator 220 receives a signal from a valve controller (similar to that shown at 105 in FIG. 3A), which, in response to a temperature difference signal from a differentiator (102), controls operation of the outlet valve 222 of the cooler 210, thereby controlling the flow rate of water through the cooler, and thus controlling the temperature of the hydrogen-side oil passing from the cooler as shown at 226.

Figure 4:
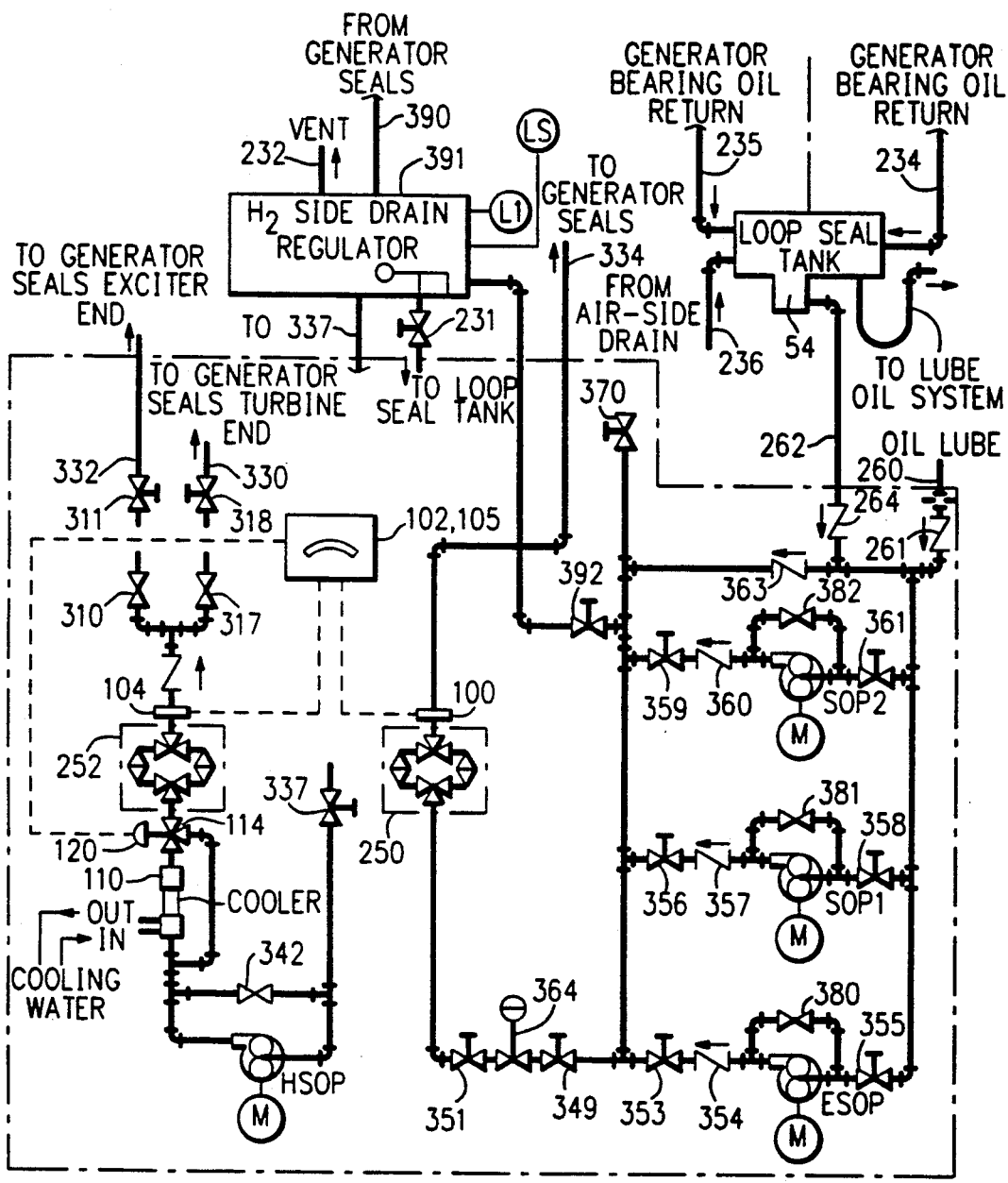
FIG. 4 shows an engineering schematic of the hydrogen- and air-side oil systems utilizing the temperature control system of FIG. 3A.

FIG. 4 illustrates the bypass arrangement of FIG. 3A in slightly greater detail. As shown in FIG. 4, the air-side pump will generally include a pair of seal oil pumps (SOP1, SOP2) driven by AC motors with an emergency seal oil pump (ESOP) driven by a DC motor. The fluid is pressurized on the hydrogen-side by an AC motor driven oil pump (HSOP). Thus, as shown in FIG. 4, the temperature of oil passing from filters 250,252 then is sensed by temperature sensors 100, 104 to produce a signal to the control unit 102, 105 which will include circuitry for differentiating the temperature signals and producing a valve control signal based upon the difference between the temperature signals. The controller 102, 105 will thus produce a signal to a valve controller 120 which controls the mixing of cooled and uncooled oil by three-way valve 114. Appropriate valving is provided to maintain the air- and hydrogen-side seal oils at the same pressure, and at a pressure which is approximately 12 psi above the hydrogen gas pressure in the generator.

One aspect of the invention disclosed in co-pending application Ser. No. 07/646,925, as shown in FIG. 4, resides in the use of the lube oil as the main feed source into the air-side system as shown at 260. Since a separate precise control of the air-side oil is not necessary with this system, oil cooled from the main lubrication system can be utilized without the need for a separate cooler. The loop seal tank is connected to the air-side oil tank as shown at 262, but only for use as a back up oil supply. In particular, the oil from the loop seal tank is supplied at a lower pressure than the lube oil such that the loop seal oil generally does not enter the system unless the lube oil pressure fails. Check valves 261, 264 are provided for preventing backflow of the oil. Thus, the lube oil is fed directly to the air-side oil system, with the hot loop seal oil utilized as a back-up or emergency flow. In contrast, in the prior art system, hot oil is fed to supply the air-side oil system from the loop seal tank, with the oil cooled by a separately controlled cooler in the air-side system. In the prior art systems, the back-up system utilized lube oil fed directly to the gland seals (i.e. at 42, 40—FIG. 2), thus requiring additional hardware for providing an appropriately pressurized flow to the gland seal as an emergency back-up.

Still referring to FIG. 4, suitable isolation valves 353, 355, 356, 358, 359 and 361 are provided to isolate various portions of the pump systems to allow for maintenance or repairs. Check valves are provided at 354, 357, 360 and 363 to prevent backflows. Bypass relief valves 342, 380, 381 and 382 are provided to feed any excess pumping fluid pressure back to the suction side of the pumps. A pressure regulator 364 controls the pressure of the air-side oil fed to the generator seal. Pressure equalizing valves 310, 317 ensure that the oils fed to the gland seals are at the same pressure. A valve 370 is provided for connecting the air-side to a turbine control system which will detect the oil pressure, and shut off the turbine generator where oil pressure is insufficient. The hydrogen-side oil is thus fed to the gland seals as indicated at 330, 332 and the air-side oil is fed to the gland seals as shown at 334. Note that the air side feed 334 is split (not shown) to feed a pair of gland seals, one on each side of the generator.

Oil draining from the hydrogen-side of the seals is drained as shown at 390, to a regulator tank 391. Oil from the generator bearings is collected by the loop seal tank as indicated at 234, 235, with oil from the regulator tank (231) and the air-side drain collected as shown at 236. Alternatively, if desired, the tank (231) drain could be fed to the air-side system rather than the loop seal tank. A level indicator LI provides a meter indication to an operator, and a level sensor LS sounds an alarm and/or causes actuation of a drain valve 231 when the tank level is too high. A solenoid 392 can be provided to admit oil from the air-side system when the level sensor indicates the level in the regulator tank is low. A vent 232 is also provided to prevent build-up of excess gas pressure in the regulator tank. Oil from the regulator tank is then fed back to the hydrogen side pump through shut off or isolation valve 337, which connection is shown as broken for clarity in the Figure.

Figure 5:
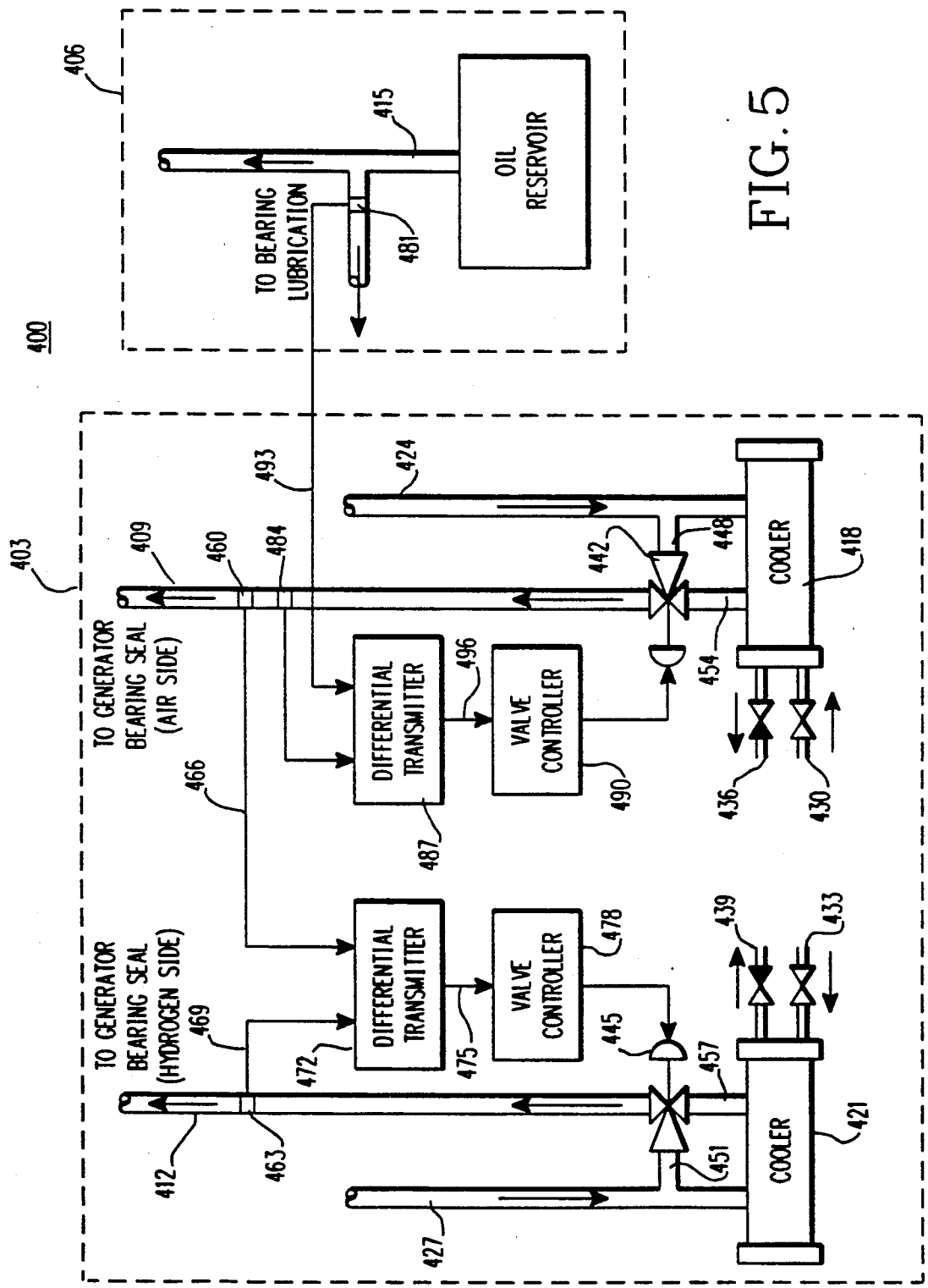
FIG. 5 is a schematic representation of the three oil supply systems supplying oil to the air- and hydrogen-sides of the seals, and the lubrication system for the bearings of the present invention.

As previously mentioned, applicants have discovered that it is also desirable to maintain the temperature of the gland seal oil supply system within a predetermined range with respect to the lube oil system. Preferably, the seal oil temperature is maintained at about 2° F. greater than the bearing lubrication oil. Referring now to FIG. 5, the apparatus of the present invention will now be discussed. FIG. 5 shows a schematic of an oil supply system 400 for a generator in which two supplies of oil 403, 406 are provided, the first 403 is for the supply of oil to the gland seals while the second 406 is for the supply of lubrication oil to the bearings. In addition, the gland seal oil supply is divided into a first portion 409 which supplies oil to the air-side and a second portion 412 which supplies oil to the hydrogen-side of the seal. The bearing lubrication oil supply system 406 supplies oil to the generator bearings via pipe 415. The embodiment shown in FIG. 5 is of the type wherein a separate cooler 418, 421 is provided for each of the air-side 409 and hydrogen-side 412 oil supplies, respectively. As seal oil is returned (424, 427) from the gland seal for both the air- and hydrogen-sides, it is sent to its respective cooler. Each cooler 418, 421 has a water inlet 430, 433 and outlet 436, 439 for effecting the cooling of the seal oil. After the seal oil has thus been cooled, the oil exits from its respective cooler to three-way mixing-/control valves 442, 445. Both of the three-way valves have an inlet conduit 448, 451 for receiving hot seal oil from the generator seals for mixing with cooled oil 454, 457, as will more fully described hereinafter. From the three-way valves 442, 445 the oil is then passed via pipes 409, 412 to the generator gland seals in the manner previously described.

Temperature sensors 460, 463 are provided in each of the pipes 409, 412, respectively, delivering the air- and hydrogen-side oils to the gland seal. The air-side oil temperature is used as a reference (first reference temperature) to control the hydrogen-side seal oil temperature (first controlled temperature). The output signals 466, 469 from these sensors are provided as inputs to a first differential temperature transmitter 472. The output 475 from the first transmitter is then used as an input to a first valve controller 478 which controls the three-way mixing valve 445 on the pipe delivering seal oil to the hydrogen-side portion of the gland seal. This is similar to the operations performed in co-pending application Ser. No. 07/646,925.

The main feature of the present invention resides in the providing of a second series of temperature sensors 481, 484, differential temperature transmitter 487 and valve controller 490 operative with respect to the bearing lubrication oil supply system 406 and the gland seal air-side oil supply 409. A third temperature sensor 481 is provided on the supply pipe 415 leading to the generator bearings (not shown). The output 493 from this sensor 481 is then provided as an input to a second differential temperature transmitter 487. This provides a second reference temperature. A separate input to the second differential transmitter is provided by another temperature sensor 484 in the air-side supply line. Although two separate sensors are shown in the figure on supply pipe 409, it is to be understood that the functions of these two sensors 460, 484 may be combined into a single sensor provided on the air-side supply pipe, the sensor having two output signals, one for each of the differential transmitters. The output from the second differential temperature transmitter 487 is then used as an input to a second valve controller 490, the output of which is provided to the three-way mixing valve 448 on the pipe delivering oil to the oil-side of the gland seal. Thus a second reference temperature (the bearing lubrication oil temperature) and a second control temperature (the gland seal air-side temperature) are provided in the system of the present invention. It is to be noted that the functions of the differential temperature transmitters 472, 487 and the valve controllers 478, 490 are capable of being combined into a single differential controller; separate arrangements are shown for clarity of discussion.

Each of the three-way mixing/control valves 445, 448 are operable to bypass hot oil 424, 427 around the respective coolers 418, 421 to the supply pipes 409, 412 to obtain the desired temperature of the air- and hydrogen-side seal oils. This arrangement ensures that the air-side and hydrogen-side seal oil temperatures can be kept substantially the same and that both these temperatures will be kept higher than the bearing lubrication oil temperature. Thus the need for constant operation attention to each of the supply systems is eliminated.

Figure 6:
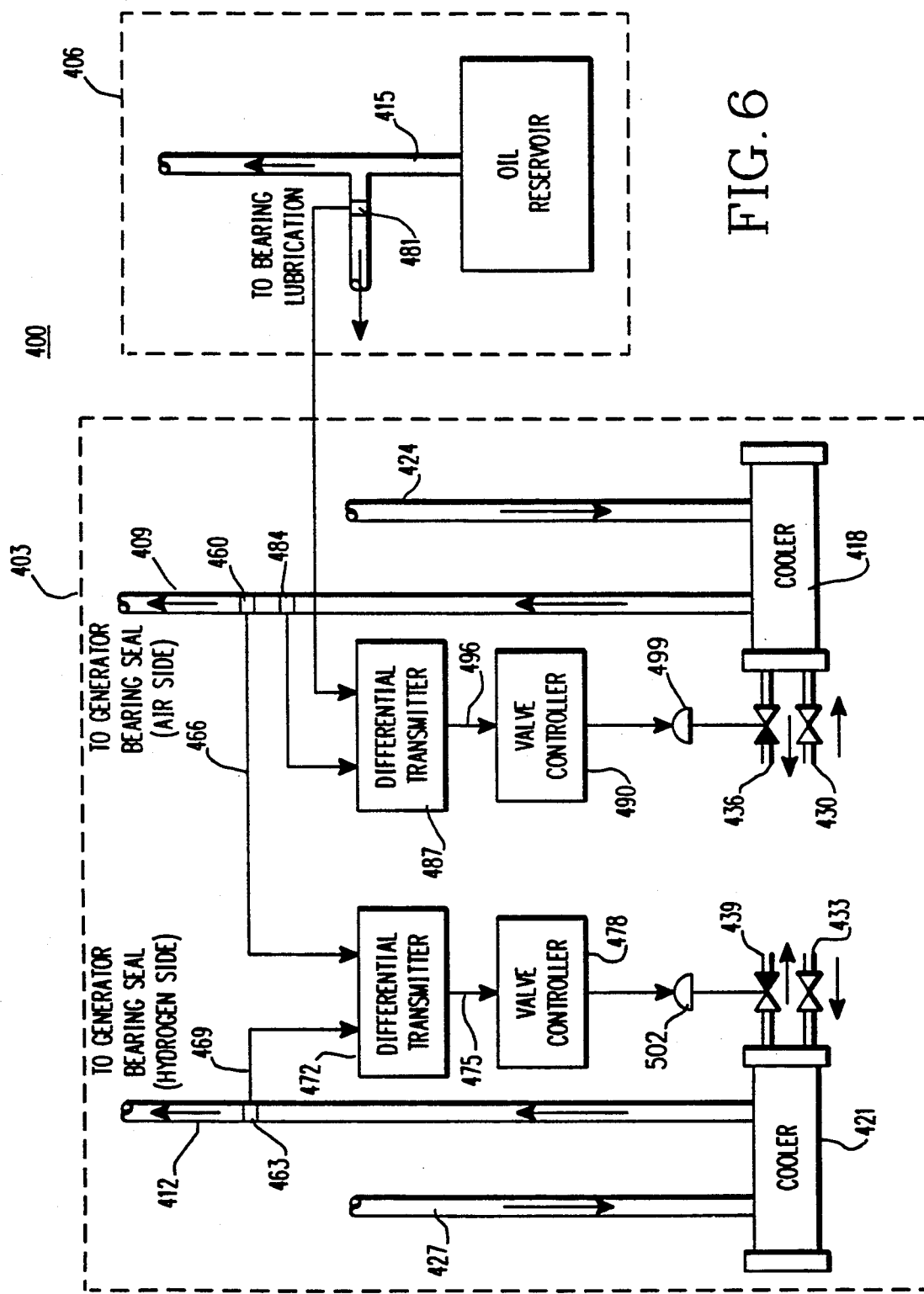
FIG. 6 shows an alternative embodiment of the supply systems of the present invention.

An alternative embodiment is shown in FIG. 6, in which the control of the gland seal oil temperatures is provided by water throttling valves 499, 502. The degree of cooling provided to the air- and hydrogen-side seal oil feeds 409, 412 is controlled by regulating the cooling water flow through each of the coolers 418, 421. Although the relative advantages of each of these methodologies was discussed hereinbefore, those oil supply systems which are already configured in this manner can be re-designed to incorporate the teachings of the present invention by adding the temperature sensor (460, 463, 481, 484), differential temperature transmitter (472, 487) and valve controller (478, 490) functions with a minimum of expense.

While specific embodiments of the invention have been described in detail, it will be appreciated by those skilled in the art that various modifications and alterations would be developed in light of the overall teachings of the disclosure. Accordingly, the particular arrangements disclosed are meant to be illustrative only and not limiting as to the scope of the invention which is to be given the full breadth of the appended claims and in any and all equivalents thereof.

What is claimed is:

1. A method for supplying seal oil to a gland seal of a generator shaft and lubrication oil to a bearing upon which the shaft rotates, the method comprising:
    providing a first supply of oil to said gland seal;
    providing a second supply of oil to said bearing;
    sensing the temperatures of said first and second supplies of oil; and
    cooling said first supply of oil such that the temperature of the first supply of oil fed to the gland seal is maintained at a predetermined difference in reference to the temperature of the second supply of oil fed to the bearing.

2. The method as recited in claim 1, wherein the step of providing the first supply of oil to said gland seal further comprises splitting the first supply of oil to first and second portions of said gland seal and maintaining the temperature of said oil supplied to said first and second portions substantially equal.

3. The method as recited in claim 1, wherein the first supply of oil fed to the gland seal is maintained at a temperature greater than the second supply of oil provided to the bearing.

4. The met as recited in claim 3, wherein the step of providing the first supply of oil to said gland seal further comprises splitting the supply of said oil to first and second portions of said gland seal and maintaining the temperature of said oil supplied to said first and second portions substantially equal.

5. A system for supplying seal oil to a gland seal for a shaft and lubrication oil to a bearing upon which the shaft rotates, wherein a gland seal supply system includes first oil feeding means for providing oil to a first portion of said gland seal and second oil feeding means for providing oil to a second portion of said gland seal, said system comprising:

first reference temperature means for providing a first reference temperature signal indicative of the temperature of the oil fed to the first portion of said gland seal;

first temperature control means for controlling the temperature of oil fed to the second portion of said gland seal in response to said first reference temperature signal;

second reference temperature means for providing a second reference temperature signal indicative of the temperature of the lubrication oil; and second temperature control means for controlling the temperature of oil fed to the first portion of said gland seal in response to said second reference temperature signal.

6. The oil supply system of claim 5, wherein said first reference temperature means includes a first reference temperature sensor positioned in the first oil feeding means upstream of said gland seal, said first reference temperature sensor producing the first reference temperature signal indicative of the temperature of the first oil feeding means fed to said first portion of said gland seal.

7. The oil supply system of claim 6, wherein said first temperature control means includes a first control temperature sensor positioned in the second oil feeding means, said first control temperature sensor producing a first control temperature signal indicative of the temperature of the second oil feeding means fed to said second portion of said gland seal.

8. The oil supply system of claim 7, wherein said first temperature control means includes a first differentiator for comparing said first reference temperature signal and said first control temperature signal and for producing a first difference signal indicative of the temperature difference between said first and second oil feeding means of said gland seal supply system.

9. The oil supply system of claim 8, wherein said first temperature control means further includes first cooling means for cooling said second oil feeding means upstream of said first control temperature sensor, said first temperature control means further including first adjusting means for adjusting the amount of cooling imparted to the second oil feeding means by said first cooling means in response to said first difference signal.

10. The oil supply system of claim 9, wherein said first cooling means includes a first cooler having water inlet and outlet passages for feeding water into and out of said first cooler for cooling the oil fed to the second portion of said gland seal, said first adjusting means including means for controlling operation of a first valve to control the flow rate of water through said first cooler in response to said first difference signal.

11. The oil supply system of claim 9, wherein said first cooling means includes a first cooler through which at least a portion of the oil fed to the second portion of said gland seal passes for cooling said oil supply, said second oil feeding means including a first oil passage feeding oil to said first cooler and a first bypass passage for feeding uncooled oil past said first cooler toward said gland seal, said first adjusting means including means for mixing cooled oil from said first cooler and uncooled oil from said first bypass passage and for varying the proportions of said cooled and uncooled oil in response to said first difference signal.

12. The oil supply system of claim 1, wherein second oil feeding means feeds oil to a hydrogen-side of said gland seal for preventing escape of hydrogen from a generator interior and said first oil feeding means feeds oil to an air-side of said gland seal for preventing access of air and moisture to the generator interior.

13. The oil supply system of claim 5, further including a lubrication oil supply system and wherein said second reference temperature means includes a second reference temperature sensor positioned in said lubrication oil supply means upstream of the bearing, said second reference temperature sensor producing the second reference temperature signal indicative of the temperature of the lubrication oil.

14. The oil supply system of claim 13, wherein said second temperature control means includes a second control temperature sensor positioned in the first oil feeding means, said second control temperature sensor producing a second control temperature signal indicative of the temperature of the first oil feeding means fed to said first portion of said gland seal.

15. The oil supply system of claim 14, wherein said second temperature control means includes a second differentiator for comparing said second reference temperature signal and said second control temperature signal and for producing a second difference signal indicative of the temperature difference between the lubrication oil and said first oil feeding means of said gland seal supply system.

16. The oil supply system of claim 15, wherein said second temperature control means further includes second cooling means for cooling said first oil feeding means upstream of said second control temperature sensor, said second temperature control means further including second adjusting means for adjusting the amount of cooling imparted to the first oil feeding means by said second cooling means in response to said second difference signal.

17. The oil supply system of claim 16, wherein said second cooling means includes a second cooler having water inlet and outlet passages for feeding water into and out of said second cooler for cooling the oil fed to the first portion of said gland seal, said second adjusting means including means for controlling operation of a second valve to control the flow rate of water through said second cooler in response to said second difference signal.

18. The oil supply system of claim 16, wherein said second cooling means includes a second cooler through which at least a portion of the oil fed to the first portion of said gland seal passes for cooling said oil supply, said first oil feeding means including a second oil passage feeding oil to said second cooler and a second bypass passage for feeding uncooled oil past said second cooler toward said gland seal, said second adjusting means including means for mixing cooled oil from said second cooler and uncooled oil from said first bypass passage and for varying the proportions of said cooled and uncooled oil in response to said second difference signal.

19. The oil supply system of claim 13, wherein said second oil feeding means feeds oil to a hydrogen-side of said gland seal for preventing escape of hydrogen from a generator interior and said first oil feeding means feeds oil to an air-side of said gland seal for preventing access of air and moisture to the generator interior.

20. The oil supply system of claim 13, wherein said second oil feeding means includes a regulator tank for regulating the amount of oil in said second oil feeding means, said regulator tank including an inlet for receiving oil from said first oil feeding means to increase the amount of oil in said tank, and an outlet for draining oil from said regulator tank to reduce the amount of oil in said regulator tank.

21. The oil supply system of claim 13, wherein said first oil feeding means is connected to the lubrication oil supply system of a turbine generator such that the lubrication system provides the primary source of oil to said first oil feeding means.

22. The oil supply system of claim 21, wherein said first oil feeding means is connected to a loop seal tank for receiving oil from said loop seal tank as a backup to the primary source of oil from the lubrication oil supply system.

* * * * *